United States Patent
Verlinden et al.

(10) Patent No.: US 9,374,251 B2
(45) Date of Patent: Jun. 21, 2016

(54) POWER ADAPTATION AVOIDANCE DURING CROSSTALK MEASUREMENTS

(75) Inventors: Jan Verlinden, Wommelgem (BE); Dirk Vanderhaegen, Wemmel (BE)

(73) Assignee: Alcatel Lucent, Boulogne-Billancourt (FR)

( * ) Notice: Subject to any disclaimer, the term of this patent is extended or adjusted under 35 U.S.C. 154(b) by 56 days.

(21) Appl. No.: 14/241,119

(22) PCT Filed: Aug. 27, 2012

(86) PCT No.: PCT/EP2012/066603
§ 371 (c)(1),
(2), (4) Date: Feb. 26, 2014

(87) PCT Pub. No.: WO2013/041328
PCT Pub. Date: Mar. 28, 2013

(65) Prior Publication Data
US 2014/0376604 A1 Dec. 25, 2014

(30) Foreign Application Priority Data

Sep. 23, 2011 (EP) .................................... 11306208

(51) Int. Cl.
| H04L 25/03 | (2006.01) |
| H04L 25/08 | (2006.01) |
| H04L 27/26 | (2006.01) |
| H04B 3/34 | (2006.01) |
| H04M 3/34 | (2006.01) |
| H04B 3/487 | (2015.01) |

(52) U.S. Cl.
CPC .......... *H04L 25/03305* (2013.01); *H04B 3/487* (2015.01); *H04L 25/0328* (2013.01); *H04L 25/085* (2013.01); *H04L 27/2691* (2013.01); *H04M 3/34* (2013.01)

(58) Field of Classification Search
None
See application file for complete search history.

(56) References Cited

U.S. PATENT DOCUMENTS

| 2004/0095921 A1 | 5/2004 | Kerpez |
| 2006/0029147 A1 | 2/2006 | Tsatsanis |

(Continued)

FOREIGN PATENT DOCUMENTS

| CN | 1866938 A | 11/2006 |
| CN | 101399575 A | 4/2009 |
| CN | 101465672 A | 6/2009 |

OTHER PUBLICATIONS

International International Search Report PCT/ISA/210 for International Application No. PCT/EP2012/066603 Dated Sep. 24, 2012.

*Primary Examiner* — Ashley Shivers
(74) *Attorney, Agent, or Firm* — Harness, Dickey & Pierce, P.L.C.

(57) ABSTRACT

In one embodiment, the access node includes a vectoring control unit for estimating crosstalk coefficients between a set of subscriber lines based on crosstalk measurements carried out over the set of subscriber lines during a crosstalk measurement phase, and a vectoring processing unit for jointly processing, for crosstalk mitigation, signals to be transmitted over, or received from, the set of subscriber lines based on the estimated crosstalk coefficients. The access node further includes a controller configured to either postpone the execution of power adaptation over a particular line out of the set of subscriber lines after the completion of the crosstalk measurement phase, or to postpone the crosstalk measurement phase after the completion of power adaptation over the particular line.

10 Claims, 3 Drawing Sheets

(56) References Cited

U.S. PATENT DOCUMENTS

| | | | |
|---|---|---|---|
| 2006/0153106 A1* | 7/2006 | Laakso | H04B 3/36 370/282 |
| 2007/0217492 A1* | 9/2007 | Cox | H04L 1/20 375/222 |
| 2009/0310502 A1* | 12/2009 | Nuzman et al. | 370/252 |
| 2010/0177838 A1* | 7/2010 | Schenk | 375/285 |
| 2010/0202554 A1* | 8/2010 | Kramer et al. | 375/285 |
| 2010/0329444 A1* | 12/2010 | Ashikhmin et al. | 379/406.06 |
| 2011/0026575 A1* | 2/2011 | Shalom et al. | 375/227 |

* cited by examiner

POWER ADAPTATION AVOIDANCE DURING CROSSTALK MEASUREMENTS

This application is the national phase under 35 U.S.C. §371 of PCT International Application No. PCT/EP2012/066603 which has an International filing date of Aug. 27, 2012, which claims priority to European patent application number EP 11306208.7 filed Sep. 23, 2011; the entire contents of each of which are hereby incorporated by reference.

TECHNICAL FIELD OF THE INVENTION

The present invention relates to an access node and method for connecting subscriber devices through a loop plant.

TECHNICAL BACKGROUND OF THE INVENTION

Crosstalk (or inter-channel interference) is a major source of channel impairment for Multiple Input Multiple Output (MIMO) communication systems, such as Digital Subscriber Line (DSL) communication systems.

As the demand for higher data rates increases, DSL systems are evolving toward higher frequency bands, wherein crosstalk between neighboring transmission lines (that is to say, transmission lines that are in close vicinity such as twisted copper pairs in a cable binder) is more pronounced (the higher frequency, the more coupling).

A MIMO system can be described by the following linear model:

$$Y(f)=H(f)\times(f)+z(f) \qquad (1),$$

wherein the N-component complex vector X, respectively Y, denotes a discrete frequency representation of the symbols transmitted over, respectively received from, the N channels, wherein the N×N complex matrix H is referred to as the channel matrix: the (i,j)-th component of the channel matrix H describes how the communication system produces a signal on the i-th channel output in response to a signal being transmitted to the j-th channel input; the diagonal elements of the channel matrix describe direct channel coupling, and the off-diagonal elements of the channel matrix describe inter-channel coupling (also referred to as crosstalk coefficients), and wherein the N-component complex vector Z denotes additional noise present over the N channels, such as Radio Frequency Interference (RFI), thermal noise and alien interference.

Different strategies have been developed to mitigate crosstalk and to maximize effective throughput, reach and line stability. These techniques are gradually evolving from static or dynamic spectral management techniques to multi-user signal coordination (or vectoring).

One technique for reducing inter-channel interference is joint signal precoding: the transmit data symbols are jointly passed through a precoding matrix before being transmitted over the respective communication channels. The precoding matrix is such that the concatenation of the precoder and the communication channel results in little or no interference at the receiver. This is achieved by adding to the original signal an anti-phase signal that is the inverse of an estimate of the aggregate crosstalk signal.

A further technique for reducing inter-channel interference is joint signal post-processing: the received data symbols are jointly passed through a crosstalk cancellation matrix before being detected. The crosstalk cancellation matrix is such that the concatenation of the communication channel and the post-coder results in little or no interference at the receiver. This is achieved by subtracting from the received signal an estimate of the aggregate crosstalk signal.

Signal precoding is particularly suited for downstream communication (towards customer premises), while signal post-processing is particularly suited for upstream communication (from customer premises). Either technique is often referred to as signal vectoring.

Signal vectoring is typically performed at a traffic aggregation point, whereat all the data symbols that are to be concurrently transmitted and/or received are available. For instance, signal vectoring is advantageously performed within a Digital Subscriber Line Access multiplexer (DSLAM).

The choice of the vectoring group, that is to say the set of communication lines, the signals of which are jointly processed, is rather critical for achieving good crosstalk cancellation performances. Within that group, each communication line is considered as a disturbing line inducing crosstalk into the other communication lines of the group, and the same communication line is considered as a victim line incurring crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, limited vectoring capabilities and/or specific network topologies may prevent such an exhaustive approach, in which case the vectoring group would include a subset only of all the interacting lines, thereby yielding limited crosstalk cancellation performances.

The performance of signal vectoring depends critically on the component values of the precoding or cancellation matrix, which component values are to be computed and updated according to the actual and varying crosstalk channels.

A method for estimating the crosstalk coefficients comprises the steps of:
simultaneously transmitting a plurality of mutually orthogonal crosstalk pilot sequences over respective ones of a plurality of disturber channels,
measuring errors induced over a victim channel while the pilot sequences are being transmitted,
correlating the error measurements with respective ones of the plurality of crosstalk pilot sequences, thereby yielding a plurality of correlated error measurements,
estimating the crosstalk coefficients from the plurality of disturber channels into the victim channel based on respective ones of the plurality of correlated error measurements.

That is, transceiver units send downstream or upstream pilot sequences. Error samples, measuring both the amplitude and phase of interference and noise over the victim channel, are fed back to a vectoring controller. The error samples are correlated with a given pilot sequence in order to obtain the crosstalk contribution from a specific disturber line. To reject the crosstalk contribution from the other disturber lines, the pilot sequences are made orthogonal, for instance by using Walsh-Hadamard sequences comprising '+1' and '−1' digits. The crosstalk estimates are used for updating the precoding or cancellation matrix. The process can be repeated as needed to obtain more and more accurate estimates.

This prior art method has been adopted by the International Telecommunication Union (ITU) for use with VDSL2 transceivers, and is described in the recommendation entitled "Self-FEXT Cancellation (vectoring) For Use with VDSL2 Transceivers", ref. G.993.5 (April 2010).

In this recommendation, the pilot signals are sent on the so-called SYNC symbols, which occur periodically after every 256 DATA symbols.

On a given disturber line, a representative subset of the active carriers (or tones) of the SYNC symbol, which are 4-QAM modulated, are rotated by 0 or 180 degrees according to the respective digit '+1' or '−1' of the pilot sequence. The remaining carriers of the SYNC symbol keeps on carrying the SYNC-FLAG for On-Line Reconfiguration (OLR) message acknowledgment.

On a given victim line, error samples, which comprise both the real and imaginary part of the frequency error on a per tone or group-of-tones basis, quantized with a certain number of bits (typically 16), are measured and reported for a specific SYNC symbol to the vectoring control unit for further crosstalk estimation.

Thus, the DSLAM shall transmit and receive the SYNC symbols over the respective vectored lines synchronously (super frame alignment) so as pilot signal transmission and interference measurements are carried out simultaneously over the respective transmission lines. Also, super frame alignment keeps regular DATA symbols from being impaired by pilot signal transmission over a new joining line, the crosstalk of which is not yet canceled.

The orthogonality requirement implies that the length of the pilot sequences is lower-bounded by the maximum number of subscriber lines to be jointly processed: the more lines, the more lengthy the pilot sequences, the longer the crosstalk measurements.

This crosstalk estimation method can be severely biased by power control commands, whereby the transmit power of one or more carriers is dynamically adjusted on account of e.g. new noise conditions. Indeed, §10.5.2 of 6.993.2 ITU recommendation (VDSL2, February 2006) states that "the $\chi(bi)$, gi and tssi values shall be applied to the SYNC symbol in the same way as they are applied to DATA symbols in showtime".

However, most crosstalk estimation algorithms that correlate the pilot sequences with the reported error samples assume that the transmit power level do not vary over time as it would affect the correlation. Considering the typical size of a vectoring group, which may comprises hundreds of lines, and the corresponding pilot sequence length, this assumption may not hold true in the field as the probability that power adaptation is carried out over one given line during the span of a pilot sequence exponentially increases with the size of the vectoring group.

A solution would be to fully disable on-line power adaptation both at the DSLAM and the CPE. This means that the line is unable to adapt itself to new noise conditions: if noise increases (e.g., RFI, residual crosstalk), there is a risk for errors, meaning a risk for line retrain.

Another solution would be to keep track of each and every carrier gain change, and to account for them in the correlation process. Clearly, this may be too costly for a large vectoring system.

Still another solution would be to just accept the errors induced by the carrier gain changes, relying on another crosstalk measurement round to get better crosstalk estimates.

SUMMARY OF THE INVENTION

It is an object of the present invention to improve crosstalk estimation and vectoring performances over a loop plant, while guaranteeing line stability.

In accordance with a first aspect of the invention, an access node for connecting subscriber devices through a loop plant comprises a vectoring control unit for estimating crosstalk coefficients between a set of subscriber lines based on crosstalk measurements carried out over the set of subscriber lines during a crosstalk measurement phase, and a vectoring processing unit for jointly processing, for crosstalk mitigation, signals to be transmitted over, or received from, the set of subscriber lines based on the estimated crosstalk coefficients.

The access node further comprises a controller configured to either postpone the execution of power adaptation over a particular line out of the set of subscriber lines after the completion of the crosstalk measurement phase, or to postpone the crosstalk measurement phase after the completion of power adaptation over the particular line.

In accordance with another aspect of the invention, a method for connecting subscriber devices through a loop plant comprises the steps of estimating crosstalk coefficients between a set of subscriber lines based on crosstalk measurements carried out over the set of subscriber lines during a crosstalk measurement phase, and jointly processing, for crosstalk mitigation, signals to be transmitted over, or received from, the set of subscriber lines based on the estimated crosstalk coefficients.

The method further comprises the step of either postponing the execution of power adaptation over a particular line out of the set of subscriber lines after the completion of the crosstalk measurement phase, or postponing the crosstalk measurement phase after the completion of power adaptation over the particular line.

The idea is to disallow the effective execution of a power adaptation command, meaning a command that alters the Power Spectral Density (PSD) shape of the transmit signal, over any particular line of the vectoring group while crosstalk measurements are on-going for that vectoring group. Examples of such commands are a bit swap command, a Seamless Rate Adaptation (SRA) command, etc. By so doing, the transmit power remains constant during the span of a pilot sequence, and the correlation process remains unbiased.

This is achieved by postponing the execution of the power adaptation command over the particular line after the completion of the crosstalk measurement phase, or by postponing the crosstalk measurement phase after the completion of the power adaptation command over the particular line.

The former gives precedence to crosstalk estimation over power adaptation, and could be helpful for instance when a new subscriber line joins the vectoring group, and crosstalk coefficients from the new joining line into the active lines need to be estimated first before the new line can start training, or still for instance during fine-tuning of carrier gains over a particular line.

The latter gives precedence to power adaptation over crosstalk estimation, and could be helpful for instance during crosstalk tracking, i.e. re-estimation of crosstalk coefficients so as to account for crosstalk channel variation if any, or still for instance during urgent communication recovery over a particular line.

Examples of access nodes according to the invention are a DSLAM, an Ethernet access bridge, an IP edge router, etc. The access node may reside at a central location (e.g., at a central office), or at a remote location closer to subscriber premises (e.g., together with a street dispatcher).

In one embodiment of the invention, the access node further comprises communication means for receiving a power adaptation command from a particular subscriber device coupled to the particular line.

Carrier gains can be dynamically adjusted by the receiver (within the limit of the transmit PSD mask, and only up to a certain extent) according to the measured noise level, that is to say by the access node for upstream communication and by the subscriber device for downstream communication. Thus, the access node can autonomously implement the proposed method for upstream communication, whereas new interactions need to be defined between the access node and the subscriber devices for downstream communication.

In one embodiment of the invention, the power adaptation command is a command whereby both transmit power and bit loading of at least one downstream carrier are adjusted over the particular line. The communication means is further configured, upon receipt of the power adaptation command, to issue a negative acknowledgment signal to the particular subscriber device if the crosstalk measurement phase is on-going. The negative acknowledgment signal comprises an error code whereby the particular subscriber device is allowed to request bit loading adjustment only.

The carrier bit loadings can still be changed during crosstalk measurements, yet the respective carrier gains shall remain constant, meaning no equalization of the noise margin. The interface between the access node and the subscriber device should allow carrier gains and bit loadings to be adjusted separately: bit loading adjustments are always allowed irrespective of whether crosstalk measurements are on-going or not, while gain adjustments are only allowed before or after the crosstalk measurement phase.

A new error code could be defined, such as "crosstalk measurements on-going-bit loading adjustment only allowed" or alike, that is returned to the CPE within the negative acknowledgment signal.

In one embodiment of the invention, the negative acknowledgment signal comprises a time value to wait before resuming power adaptation over the particular line.

This embodiment is advantageous as it avoids the CPE repeating incessantly the power adaptation command during the crosstalk measurement phase: the CPE is rather requested to wait for a certain time value to expire before issuing again the power adaptation command. The time value is determined according to the current remaining time till the completion of the on-going crosstalk measurements.

In one embodiment of the invention, the communication means is further configured to issue, to the particular subscriber device, a suspend signal before the crosstalk measurement phase takes place, whereby the particular subscriber device is requested to suspend power adaptation over the particular line, and whereby the particular subscriber device is allowed to request bit loading adjustment only.

This embodiment proactively prevents the CPE from issuing any power control command while crosstalk measurements are on-going by issuing a suspend signal at the beginning of the crosstalk measurement phase.

In one embodiment of the invention, the suspend signal comprises a time value to wait before resuming power adaptation over the particular line.

This time value is determined according to the expected length of the crosstalk measurement phase.

In an alternative embodiment of the invention, the communication means is further configured to issue, to the particular subscriber device, a resume signal after the crosstalk measurement phase took place, whereby the particular subscriber device is allowed to resume power adaptation over the particular line.

Further characterizing embodiments are mentioned in the appended claims.

The present invention also relates to a subscriber device for connecting to an access node through a subscriber line.

In accordance with still another aspect of the invention, the subscriber device is configured to issue a power adaptation command to the access node whereby both transmit power and bit loading of at least one downstream carrier are adjusted over the subscriber line, to receive a negative acknowledgment signal from the access node if a crosstalk measurement phase is on-going, the negative acknowledgment signal comprising an error code whereby the particular subscriber device is allowed to request bit loading adjustment only, and thereupon to issue a further command to the access node whereby only bit loading of the at least one downstream carrier is adjusted without altering the respective carrier gain.

In one embodiment of the invention, the negative acknowledgment signal comprises a time value, and the subscriber device is further configured to wait for the time value to expire before resuming downstream power adaptation over the subscriber line.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
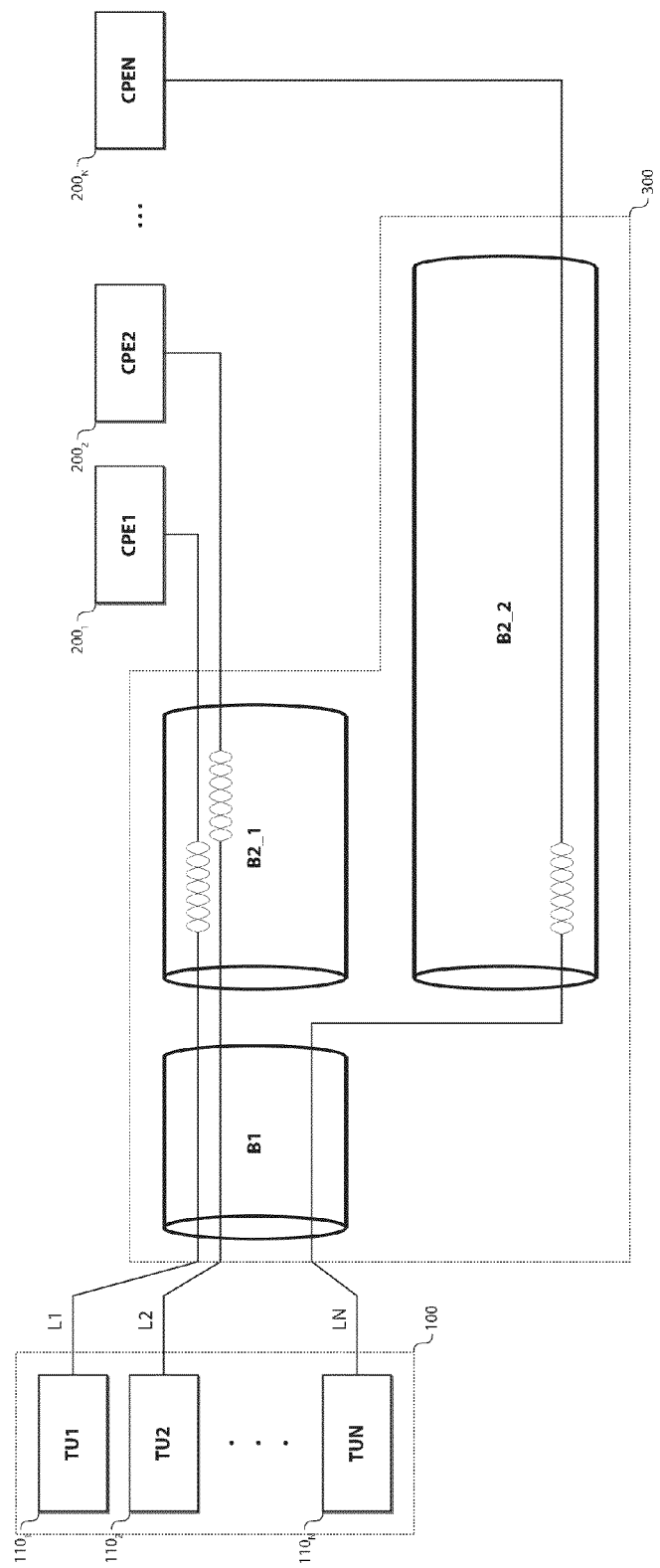
FIG. 1 represents a DSL communication system.

There is seen in FIG. 1 a DSL communication system 1 for providing broadband access to subscribers.

The DSL communication system 1 comprises a loop plant 300, a DSLAM 100 and N CPEs $200_1$ to $200_N$ (or CPE1 to CPEN). The DSLAM 100 comprises N transceivers $110_1$ to $110_N$ (or TU1 to TUN) coupled via N subscriber lines L1 to LN to respective ones of the N CPEs $200_1$ to $200_N$. The subscriber lines L1 to LN are for example Unshielded Twisted Pairs (UTP).

The subscriber lines L1 to LN are bundled together within one or more binders B1, B2_1 and B2_2, and induce crosstalk into each other as they are in close vicinity over whole or part of their length. The subscriber lines L1 to LN are assumed to form part of the same vectoring group.

Because downstream and upstream communications are assigned different and non-overlapping frequency bands—Frequency Division Duplexing (FDD)—, crosstalk mostly reduces to Far-End Crosstalk (FEXT): some substantial amount of the signal transmitted by a transceiver (the disturber) couples into a neighboring line and impairs reception of the direct signal received over that neighboring line at a remote transceiver (the victim). For instance, the downstream signal transmitted by the transceiver $110_1$ over line L1 couples into line L2 and is detected as noise by the CPE $200_2$. Also, the upstream signal transmitted by the CPE $200_2$ over line L2 couples into line L1 and is detected as noise by the transceiver $110_1$.

Figure 2:
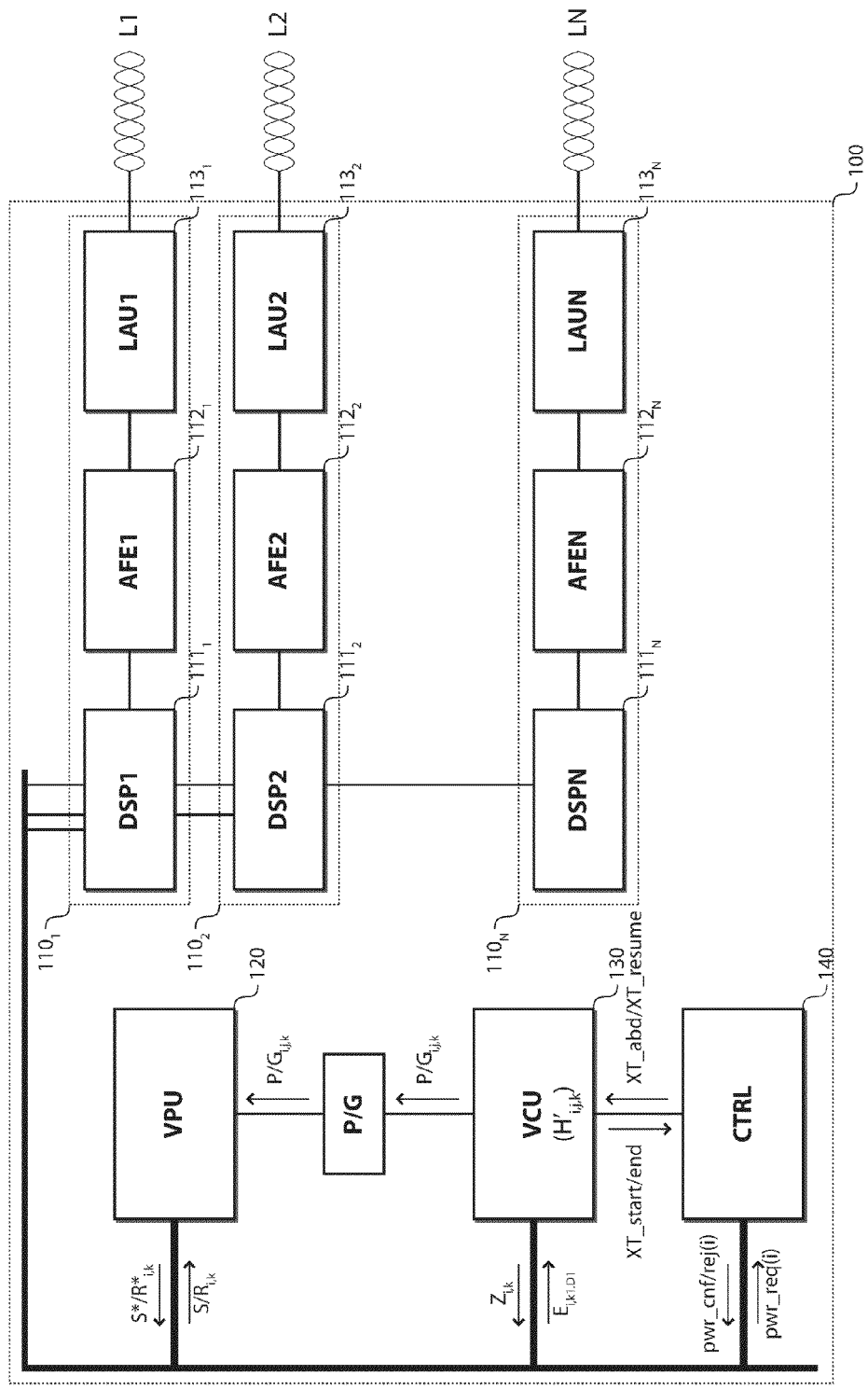
FIG. 2 represents an access node according to the invention.

There is seen in FIG. 2 further details about the DSLAM 100.

The DSLAM 100 comprises the following functional blocks:

the N transceivers 110, a Vectoring Processing Unit 120 (or VPU), a Vectoring Control Unit 130 (or VCU) for controlling the operation of the VPU 120, and a controller 140 (or CTRL).

Each one of the transceivers 110 is coupled to the VPU 120, the VCU 130 and the controller 140. The VCU 130 is further coupled to the VPU 120. The controller 140 is further coupled to the VCU 130.

The VPU 120 and the VCU 130 can be co-located with the transceivers 110 on a single Line Termination (LT) board for board level vectoring, or can form part of a dedicated Printed Board Assembly (PBA) for system level vectoring.

Each one of the transceivers 110 comprises:

a Digital Signal Processor (DSP) 111, an Analog Front End (AFE) 112, and a Line Adaptation Unit (LAU) 113.

The N DSPs 111 are coupled to respective ones of the N AFE units 112. The N AFEs 112 are further coupled to respective ones of the N LAUs 113. The N LAUs 113 are further coupled to respective ones of the N lines L1 to LN.

Each one of the DSPs 111 is arranged to operate both a downstream and an upstream DSL communication channel.

Each one of the DSPs 111 is for encoding and modulating user and control data into digital data symbols, and for de-modulating and decoding user and control data from digital data symbols.

The following transmit steps are typically performed within the DSPs 111:

data encoding, such as data multiplexing, framing, scrambling, error correction encoding and interleaving, signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding, signal scaling, Inverse Fast Fourier Transform (IFFT)

Cyclic Prefix (CP) insertion, and time-windowing.

The following receive steps are typically performed within the DSPs 111:

time-domain signal equalization,

Cyclic Prefix (CP) removal,

Fast Fourier Transform (FFT), frequency-domain signal equalization, signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, possibly with Trellis decoding, and re-ordering all the detected chunks of bits according to the carrier ordering table, data decoding, such as data de-interleaving, RS decoding (byte errors, if any, are corrected at this stage), de-scrambling, frame delineation and de-multiplexing.

Each one of the DSPs 111 is further configured to operate an Embedded Overhead Channel (EOC) that is used to transport control and management messages, such as OLR commands and responses. The EOC data are multiplexed with the user data over the DSL channel.

Each one of the AFEs 112 comprises a Digital-to-Analog Converter (DAC) and an Analog-to-Digital Converter (ADC), a transmit filter and a receive filter for confining the signal energy within the appropriate communication frequency bands while rejecting out-of-band interferences, a line driver for amplifying the transmit signal and for driving the transmission line, and a Low Noise Amplifier (LNA) for amplifying the receive signal with as little noise as possible.

Each one of the LAUs 113 comprises a hybrid for coupling the transmitter output to the transmission line and the transmission line to the receiver input while achieving low transmitter-receiver coupling ratio (e.g., by means of echo cancellation techniques), further transmit and receive high-pass filters for filtering out any unwanted signals present in the POTS/ISDN frequency bands, impedance-matching circuitry for adapting to the characteristic impedance of the line, and isolation circuitry (typically a transformer).

Each one of the DSPs 111 is further configured to supply transmit frequency-domain samples to the VPU 120 before Inverse Fast Fourier Transform (IFFT) step for joint signal precoding, and to supply receive frequency-domain samples to the VPU 120 after Fast Fourier Transform (FFT) step for joint signal post-processing.

Each one of the DSPs 111 is further configured to receive corrected frequency-domain samples from the VPU 120 for further transmission or detection. Alternatively, the DSPs 111 may receive correction samples to add to the initial frequency-domain samples before further transmission or detection.

The VPU 120 is configured to mitigate the crosstalk induced over the transmission lines L1 to LN. This is achieved by multiplying a vector S of transmit frequency-domain samples with a precoding matrix P so as to compensate for an estimate of the coming crosstalk (downstream), or by multiplying a vector R of receive frequency-domain samples with a crosstalk cancellation matrix G so as to cancel an estimate of the incurred crosstalk (upstream).

Let i denotes a line index ranging from 1 to N, k a frequency index ranging from 0 to K−1, and l a Discrete Multi-Tone (DMT) symbol index.

Let $S_{i,k}^{l}$ and $S^{*}{}_{i,k}^{l}$ denote the transmit frequency-domain samples transmitted over line Li during DMT symbol l before and after crosstalk pre-compensation by the VPU 121 respectively.

Similarly, let $R_{i,k}^{l}$ and $R^{*}{}_{i,k}^{l}$ denote the receive frequency-domain samples received from line Li during DMT symbol l before and after crosstalk cancellation respectively.

We have:

$$S_k^{*l} = \begin{bmatrix} S_{1,k}^{*l} \\ S_{2,k}^{*l} \\ \vdots \\ S_{N,k}^{*l} \end{bmatrix} \qquad (2)$$

$$= P_k \cdot S_k^{l}$$

$$= \begin{bmatrix} 1 & P_{1,2,k} & \cdots & P_{1,N,k} \\ P_{2,1,k} & 1 & & \vdots \\ \vdots & & & P_{N-1,N,k} \\ P_{N,1,k} & \cdots & P_{N,N-1,k} & 1 \end{bmatrix} \cdot \begin{bmatrix} S_{1,k}^{l} \\ S_{2,k}^{l} \\ \vdots \\ S_{N,k}^{l} \end{bmatrix},$$

and

-continued $$R_k^{*l} = \begin{bmatrix} R_{1,k}^{*l} \\ R_{2,k}^{*l} \\ \vdots \\ R_{N,k}^{*l} \end{bmatrix} \quad (3)$$

$$= G_k \cdot R_k^l$$

$$= \begin{bmatrix} 1 & G_{1,2,k} & \cdots & G_{1,N,k} \\ G_{2,1,k} & 1 & & \vdots \\ \vdots & & & G_{N-1,N,k} \\ G_{N,1,k} & \cdots & G_{N,N-1,k} & 1 \end{bmatrix} \cdot \begin{bmatrix} R_{1,k}^l \\ R_{2,k}^l \\ \vdots \\ R_{N,k}^l \end{bmatrix}.$$

In the matrix P or G, a row i represents a particular victim line Li, while a column j represents a particular disturber line Lj. At the intersection, the coupling coefficient that should be applied to the corresponding disturber transmit or receive frequency-domain sample for mitigating over the victim line Li the crosstalk from the disturber line Lj. Not all the coefficients of the matrix need to be determined, for instance on account of limited vectoring capabilities first assigned to the strongest crosstalkers, or still for instance due to the fact that some lines do not noticeably interact with each other. The undetermined coefficients are preferably set to 0.

The VCU 130 is basically for controlling the operation of the VPU 120, and more specifically for initializing or updating the precoding matrix P and the crosstalk cancellation matrix G.

The VCU 130 starts first by configuring the respective downstream and upstream pilot sequences to be used over the lines L1 to LN. The pilot sequences are mutually orthogonal pilot sequences of length L. The pilot sequence transmitted over line Li at frequency index k is denoted as $Z_{i,k}$ and comprises L pilot digits $\{Z_{i,k}^l\}$ to be transmitted over L SYNC symbols.

The VCU 130 gathers respective slicer errors as measured during the detection of the SYNC symbols by the remote CPEs 200 for downstream communication, and by the DSPs 111 for upstream communication. The equalized interference measurements carried out over a victim line Li at frequency index k during SYNC symbol index l are denoted as $E_{i,k}^l$.

Typically, and in order to reduce the amount of error feedback information, interference measurements are only available at frequency indexes $k1 \cdot D1$, wherein D1 denotes a decimation factor, and k1 denotes a further frequency index ranging from 0 to $K/D1-1$.

Next, the VCU 130 correlates the interference measurements $E_{i,k1 \cdot D1}^l$ as measured over the victim line Li with the respective pilot sequence transmitted over the disturber line Lj so as to obtain an estimate of the equalized crosstalk coefficients $H'_{i,j,k1 \cdot D1}$ from line Lj into line Li at frequency indexes $k1 \cdot D1$, wherein:

$$H'_{i,j,k1 \cdot D1} = \frac{H_{i,j,k1 \cdot D1}}{H_{i,i,k1 \cdot D1}} \quad (4)$$

The missing crosstalk coefficients $H'_{i,j,k}$ at intermediary frequency indexes k, with $k1 \cdot D1 < k < (k1+1) \cdot D1$, are determined by interpolation.

The VCU 130 can now proceed with the computation of the precoding matrix P and the crosstalk cancellation matrix G from the so-determined crosstalk coefficients. The VCU 130 can use a first-order matrix inversion to compute the coefficients of the precoding matrix P and the crosstalk cancellation matrix G, or any other suitable method.

The VCU 130 is further configured to notify the controller 140 whenever a new crosstalk measurement round is initiated for initializing or updating the precoding matrix P and/or the crosstalk cancellation matrix G (see XT_start message in FIG. 2).

Downstream crosstalk measurements are initiated with the DSLAM 100 issuing first ERROR FEEDBACK messages to the CPEs 200 for gathering the respective error samples $E_{i,k1 \cdot D1}^l$. Such first ERROR FEEDBACK messages comprise an error sample update period greater than 0, typically 1, an error sample shift period, typically 0, a range of carrier indexes to be covered in the report, and error report control parameters.

The VCU 130 is further configured to notify the controller 140 whenever an on-going crosstalk measurement round is completed (see XT_end message in FIG. 2). The crosstalk measurement round is completed when a multiple of L consecutive error samples $E_{i,k1 \cdot D1}^l$ have been gathered over every line Li.

Thereupon, the DSLAM 100 issues second ERROR FEEDBACK messages to the CPEs 200 to stop gathering the respective downstream error samples $E_{i,k1 \cdot D1}^l$. Such second ERROR FEEDBACK messages comprise a error sample update period that is set to 0.

Upon receipt of an OLR command from CPE 200$_i$ on a given line Li for adjusting the transmit power of one or more downstream carriers, the DSP 111$_i$ requests the controller 140 whether it is allowed to proceed with this power adaptation command (see pwr_req(i) message in FIG. 2). If so, the DSP 111$_i$ acknowledges the received OLR command by issuing a SYNC flag, else the DSP 111$_i$ returns a negative acknowledgment comprising a specific error code, as well as a timer value for resuming power adaptation over the line Li. This timer value is determined and supplied by the controller 140 according to the remaining time till the end of the crosstalk measurement round.

Similarly, before the issuance of an OLR command by a DSP 111$_i$ on a given line Li for adjusting the transmit power of one or more upstream carriers, the DSP 111$_i$ requests the controller 140 whether it is allowed to proceed with this power adaptation command (see pwr_req(i) message in FIG. 2). If so, the DSP 111$_i$ sends the OLR command to the CPE 200$_i$ for further execution.

Examples of such OLR commands are:
a bit swap command, whereby the receiver reallocates bits and power among the carriers without changing the aggregate data rate,
an SRA command, whereby the receiver re-allocates bits and power among the carriers with the aggregate data rate being changed.

The controller 140 is configured to allow or disallow (see pwr_cnf(i) and pwr_rej(i) messages respectively in FIG. 2) the effective execution of a power adaptation command on a given line Li in dependence of whether a crosstalk measurement round is on-going or not, and in dependence of the current operational context of both the DSLAM 100 and the CPEs 200 (vectoring group initialization, new joining line that needs to be brought quickly into service, urgent communication recovery over a particular line, etc, versus carrier gain fine-tuning, crosstalk tracking, etc).

If a crosstalk measurement round is on-going for a specific vectoring group, then any power adaptation command to be executed over a line out of that vectoring group is postponed till the completion of the crosstalk measurement round for that vectoring group, or alternatively the already-gathered crosstalk measurements are discarded, the power adaptation command is executed at once (see XT_abd message in FIG. 2) and the crosstalk measurement phase is re-scheduled at a later time after the completion of the power adaptation command.

Figure 3:
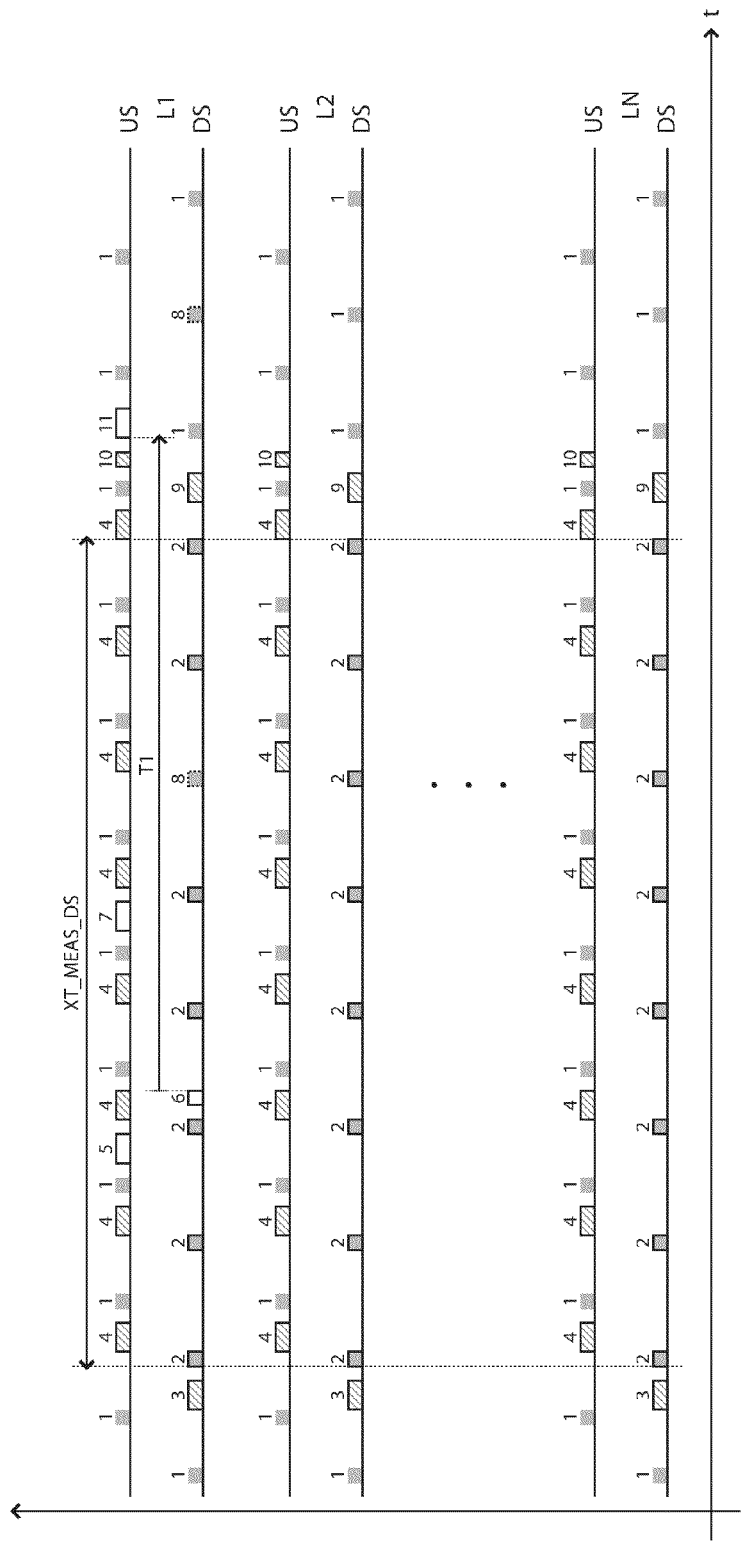
FIG. 3 represents a time plot of pilot sequences, power adaptation command and acknowledgment signals as transmitted over a loop plant.

An operation of this embodiment is now set forth with regard to FIG. 3.

There is seen in FIG. 3 a time graph of both downstream and upstream transmission over lines L1 to LN.

Downstream and upstream SYNC symbols are plotted as shadowed squares labeled with reference numeral 1. SYNC symbols are transmitted every 256 DATA symbols.

The VCU 130 first notifies the controller 140 that a new crosstalk measurement round for downstream communication XT_MEAS_DS will soon start (see XT_start message in FIG. 3). Presently, the crosstalk measurement phase XT_MEAS_DS comprises L=8 consecutive SYNC symbols.

The VCU 130 next commands the DSPs 111 to issue first ERROR FEEDBACK messages 3 over the lines L1 to LN to start error sample reporting by the CPEs 200. The message 3 are not acknowledged by the CPEs 200.

Thereupon, the CPEs 200 measures slicer errors while detecting the SYNC symbols whose index is specified by the ERROR FEEDBACK message, and sends ERROR FEEDBACK DATA messages 4 comprising the error samples to the DSLAM 100 for further crosstalk estimation. The ERROR FEEDBACK DATA messages 4 are not acknowledged. The SYNC symbols that are used for downstream crosstalk measurements are labeled with reference numeral 2, and are highlighted with a solid line.

At some time, the CPE $200_1$ sends an OLR command 5, whereby the bit loading and gains of one or more downstream carriers is adjusted Upon receipt of the OLR command 5, the DSP $111_1$ asks the controller 140 whether it is allowed to proceed with downstream power adaptation over line L1. Presently, as the downstream crosstalk measurement phase XT_MEAS_DS is on-going, the request is rejected, and the DSP $111_1$ issues a NACK message 6 in response to the OLR command 5. The NACK message 6 comprises a reason code such as "crosstalk measurements on-going-bit loading adjustment only allowed", and a time value T1 to wait before resuming downstream power adaptation over line L1. The time value T1 is computed according to the remaining time till the completion of the downstream crosstalk measurement phase XT_MEAS_DS, possibly with some additional margin.

Upon receipt of the NACK message 6, the CPE $200_1$ re-determines new bit loading values without altering the carrier gains now, and sends a new OLR command 7, whereby only the bit loading of one or more downstream carriers is adjusted. The command 7 may further comprise unchanged gain values. The DSP $111_1$ acknowledges this new configuration by issuing a SYNC flag. The SYNC symbols that carry a SYNC flag are labeled with reference numeral 8, and are highlighted with a dashed line.

Finally, the VCU 130 notifies the controller 140 that the current crosstalk measurement phase XT_MEAS_DS is completed (see XT_end message in FIG. 3).

The VCU 130 commands the DSPs 111 to issue second ERROR FEEDBACK messages 9 over the lines L1 to LN to stop error sample reporting by the CPEs 200. The CPEs 200 return NACKs 10 to the DSLAM 100, and stop reporting error samples.

The second ERROR FEEDBACK messages 9 are optional: the CPEs 200 would keep on reporting error samples to the access node 100, and the access node 100 would discard them as no crosstalk estimation is presently required.

Upon expiry of the timer T1, the CPE $200_1$ issues a new OLR command 11 whereby the carrier gains are adjusted so as to equalize the noise margin. This new command may further contain some adjusted bit loadings too.

Upon receipt of the OLR command 11, the DSP $111_1$ asks the controller 140 whether it is allowed to proceed with power adaptation. Presently, as the crosstalk measurement phase XT_MEAS_DS is completed, the request is allowed, and the DSP $111_1$ acknowledges this new configuration by issuing a SYNC flag.

Alternatively, the controller 140 may give precedence to the power adaptation command 5 depending on the current operational context of both the DSLAM 100 and the CPEs 200. For that purpose, the power adaptation command 5 may further convey CPE operational context information of the CPE $200_1$. The controller 140 would then request the VCU 140 to discard the already-gathered crosstalk measurements (see XT_abd message in FIG. 2), and would allow the DSP $111_1$ to proceed at once with the execution of the power adaptation command 5. ERROR FEEDBACK messages does not need to be issued by the DSLAM 100 for stopping error samples reporting by the CPEs 200 as crosstalk measurements will be resumed soon. The DSP $111_1$ would then issue a SYNC flag over line L1 for acknowledging the command 5. Thereupon, the controller 140 would inform the VCU 130 to resume crosstalk measurements (see XT_resume message in FIG. 2), and a new crosstalk measurement round would then take place over the lines L1 to LN after the completion of the command 5.

The foregoing description similarly applies to estimation of upstream crosstalk coefficients and power adaptation of upstream carriers, yet with the following exceptions:

no ERROR FEEDBACK/ERROR FEEDBACK DATA message is exchanged between the DSLAM 100 and the CPEs 200 as crosstalk measurements are performed by the DSPs 111, and are immediately available for further processing by the VCU 130;

PILOT SEQUENCE UPDATE messages are sent to the CPEs 200 for configuring/updating the respective upstream pilot sequences used by the CPEs 200;

power adaptation of upstream carriers is controlled by the DSPs 111, which first seek allowance from the controller 140, before proceeding further: if an upstream crosstalk measurement round is on-going then the power adaptation command is postponed till the completion of the upstream crosstalk measurement round, or the upstream crosstalk measurement round is postponed after the effective execution of the power adaptation command, whichever case applies.

In the event of a new line joining the vectoring group, let us say line L1 joining the group of active lines L2 to LN, the scenario would be slightly different. During the initialization step, both the downstream and upstream crosstalk coefficients from the new joining line L1 into the active lines L2 to LN need to be estimated first (O-P-VECTOR 1 and R-P-VECTOR 1 initialization phases) before the line L1 can even start training so as crosstalk from the new joining line L1 can be mitigated over the active lines L2 to LN. The DSP $111_1$ detects an initialization event over line L1 (e.g., upon initiation of the G.994.1 handshake phase), and notifies this event to the VCU 130. The VCU 130 informs in turn the controller 140 that a new crosstalk measurement round will soon start over lines L1 to LN (see XT_start message in FIG. 2). No power adaptation is expected to take place over line L1 during the initialization phase, yet power adaptation may still take place over the active lines L2 to LN. As these power adaptation commands can bias the estimates of the new crosstalk coefficients, and as the new joining line L1 waits for crosstalk estimation to completes before entering show time, these power adaptation commands are nacked and postponed after the crosstalk measurement round.

In an alternative embodiment, the controller 140 requests the DSP 111 to issue POWER ADAPTATION SUSPEND commands to the CPEs 200 in order to proactively prevent the CPE 200 from issuing downstream power adaptation commands during the course of the crosstalk measurement phase XT_MEAS_DS. The DSP 111 and the CPEs 200 are still allowed to adjust the carrier bit loading of upstream and downstream carriers respectively, but without altering the carrier gains.

The POWER ADAPTATION SUSPEND commands comprise a time value T2 to wait before resuming downstream power adaptation over lines L1 to LN. The time value T2 is computed according to the expected length of the downstream crosstalk measurement phase XT_MEAS_DS, possibly with some additional margin.

Alternatively, upon completion of the crosstalk measurement phase XT_MEAS_DS, the controller 140 requests the DSP 111 to issue a POWER ADAPTATION RESUME commands to the CPEs 200 in order to allow again downstream power adaptation over lines L1 to LN.

It is to be noticed that the VCU 130 and the controller 140 can be merged into one single controlling unit.

It is also to be noticed that downstream and upstream crosstalk measurements and estimation can be carried out independently from each other, and that upstream power adaptation can take place while downstream crosstalk measurements are on-going, and the way around.

It is also to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is also to be noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. An access node configured to connect a plurality of subscriber devices through a loop plant, the access node comprising:
   a memory having a computer readable instructions stored therein; and
   a processor configured to execute the computer-readable instructions to,
      estimate crosstalk coefficients between a set of subscriber lines based on crosstalk measurements carried out over the set of subscriber lines during a crosstalk measurement phase;
      jointly process signals to be transmitted over, or received from, the set of subscriber lines based on the estimated crosstalk coefficients to mitigate crosstalk;
      receive a power adaptation command from at least one of the plurality of subscriber devices coupled to a subscriber line of the set of subscriber lines; and
      control execution of the power adaptation command and the estimation of the crosstalk coefficients over at least one subscriber line from the set of subscriber lines such that the execution of the power adaptation command and the estimation of the crosstalk coefficients do not overlap, the processor being configured to perform the controlling by exchanging at least one of a negative acknowledgement signal in response to the received power adaptation command and a suspend signal.

2. The access node according to claim 1, wherein
   the power adaptation command is a command for adjusting a transmit power and a bit loading of at least one downstream carrier is adjusted over the subscriber line,
   the digital signal processor is further configured to, upon receipt of the power adaptation command, issue the negative acknowledgment signal to the subscriber device if the crosstalk measurement phase is on-going, and
   the negative acknowledgment signal includes an error code for allowing the at least one of the plurality subscriber devices to request the bit loading adjustment.

3. The access node according to claim 2, wherein the negative acknowledgment signal includes a time value to wait before resuming a downstream power adaptation over the subscriber line.

4. The access node according to claim 1, wherein the digital signal processor is further configured to issue, to the at least one of the plurality of subscriber devices, the suspend signal before the crosstalk measurement phase takes place for requesting the at least one of the plurality of subscriber devices to suspend the downstream power adaptation over the subscriber line, and for allowing the at least one of the plurality of subscriber devices to request a bit loading adjustment.

5. The access node according to claim 4, wherein the suspend signal includes a time value to wait before resuming the downstream power adaptation over the subscriber line.

6. The access node according to claim 4, wherein the digital signal processor is further configured to issue, to the at least one of the plurality of subscriber devices, a resume signal after the crosstalk measurement phase, for allowing the at least one of the plurality of subscriber devices to resume the downstream power adaptation over the subscriber line.

7. The access node according to claim 1, wherein the access node is a Digital Subscriber Line Access Multiplexer.

8. A subscriber device for connecting to an access node through a loop plant, the subscriber device comprising:
  a memory having computer readable instructions stored thereon; and
  a processor configured to execute the computer-readable instructions to,
    connect to the access node through a subscriber line of the loop plant,
    issue a power adaptation command to the access node for adjusting a transmit power and a bit loading of at least one downstream carrier over the subscriber line,
    receive a negative acknowledgment signal from the access node if a crosstalk measurement phase is on-going over one or more subscriber lines, the negative acknowledgment signal including an error code for allowing the subscriber device to request a bit loading adjustment, and thereupon to issue another command to the access node for adjusting the bit loading of the at least one downstream carrier without altering the respective carrier gain.

9. The subscriber device according to claim 8, wherein the negative acknowledgment signal comprises a time value,
  and wherein the subscriber device is further configured to wait for the time value to expire before resuming downstream power adaptation over the subscriber line.

10. A method for connecting a plurality of subscriber devices through a loop plant, and the method comprising:
  estimating crosstalk coefficients between a set of subscriber lines based on crosstalk measurements carried out over the set of subscriber lines during a crosstalk measurement phase;
  processing, for crosstalk mitigation, signals to be transmitted over, or received from, the set of subscriber lines based on the estimated crosstalk coefficients;
  receiving a power adaptation command from at least one of the plurality of subscriber devices coupled to one or more subscriber lines of the set of subscriber lines; and
  exchanging at least one of a negative acknowledgement signal in response to the received power adaptation command and a suspend signal, to control an execution of the power adaptation command and the estimation of the crosstalk coefficients over at least one a subscriber line from the set of subscriber lines such that the execution of the power adaptation command and the estimation of the crosstalk coefficients do not overlap.

\* \* \* \* \*